United States Statutory Invention Registration [19]

[11] Reg. Number: H388

Lloyd [43] Published: Dec. 1, 1987

[54] APPARATUS AND METHOD FOR LOCATING TOWED SEISMIC FLOATS

[75] Inventor: Joseph P. Lloyd, Houston, Tex.

[73] Assignee: Shell Oil Company, Houston, Tex.

[21] Appl. No.: 687,630

[22] Filed: Dec. 31, 1984

[51] Int. Cl.[4] ..... G01V 1/38; G01S 3/80

[52] U.S. Cl. ..... 367/19; 367/125; 367/130

[58] Field of Search ..... 367/6, 19, 106, 105, 367/119, 123, 125, 130; 364/449, 450, 456

[56] References Cited

U.S. PATENT DOCUMENTS

| | | | |
|---|---|---|---|
| 2,405,238 | 8/1946 | Seeley | 367/6 |
| 3,460,060 | 8/1969 | Abruzzo et al. | 367/6 |
| 3,905,007 | 9/1975 | Koesy | 367/6 |
| 4,110,726 | 8/1978 | Dorrance et al. | 367/6 |
| 4,219,886 | 8/1980 | Anderson | 367/106 |
| 4,446,538 | 5/1984 | Zachariadis | 367/19 |
| 4,532,617 | 7/1985 | Baecker et al. | 367/19 |
| 4,559,621 | 12/1985 | Delignieres | 367/130 |

FOREIGN PATENT DOCUMENTS

| | | | |
|---|---|---|---|
| 0567322 | 12/1932 | Fed. Rep. of Germany | 367/130 |
| 2487986 | 2/1982 | France | 367/6 |
| 0219726 | 8/1924 | United Kingdom | 367/19 |
| 2089043 | 6/1982 | United Kingdom | 367/6 |

OTHER PUBLICATIONS

Leroy et al., "Acoustic Measuring, . . . Performances", pp. 849–863, 5/8/74, O.T.C., vol. 1, O.T.C. 2026, p. 850 in particular.

Calcar–"Precision Subsea Navigation System," 11/4/69, pp. 155–172, Proc. of 10N National Marine Nav. Mtg.

*Primary Examiner*—Stephen C. Buczinski
*Assistant Examiner*—Linda J. Wallace

[57] ABSTRACT

Method and apparatus are provided for locating a towed float relative to the towing vessel. The method determines the range from at least two known spaced apart locations on the towing vessel to the float and determines the position of the float from the intersection of the at least two ranges. The apparatus includes a microwave transceiver selectably interconnectable with a plurality of microwave antennas at known spaced apart locations on a towing vessel, a microwave transponder on each float whose locations is to be determined, and suitable controller and/or computer means to calculate ranges and intersections of ranges.

5 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

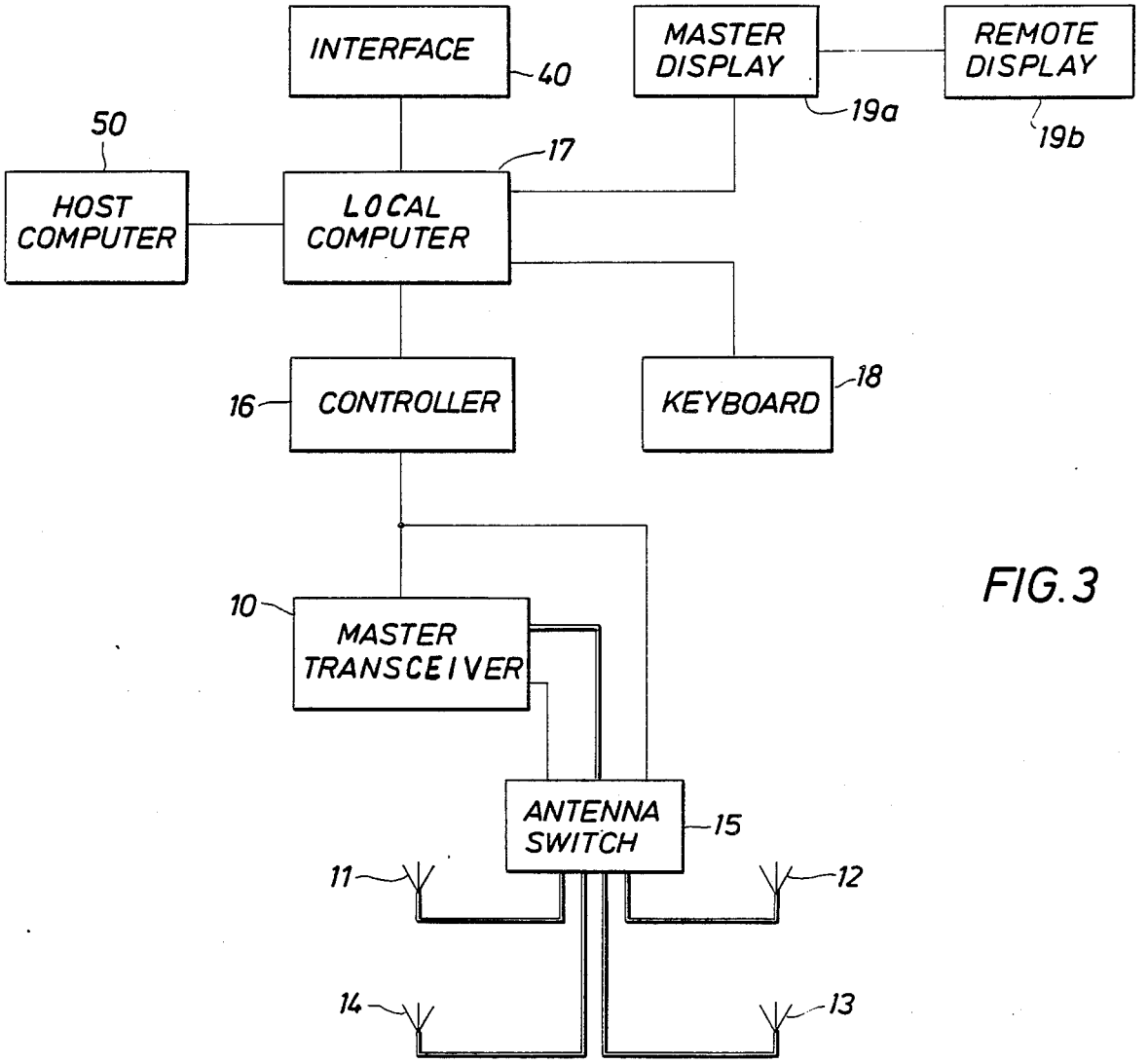
FIG. 3
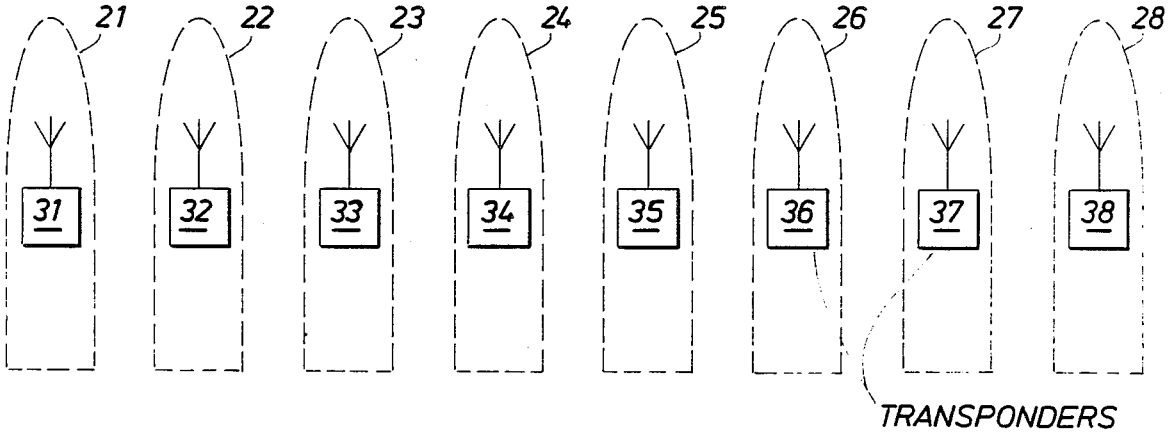

APPARATUS AND METHOD FOR LOCATING TOWED SEISMIC FLOATS

BACKGROUND OF THE INVENTION

This invention relates to marine seismic exploration, and more particularly, relates to determining the position of a towed marine seismic source.

In marine seismic exploration, impulsive sources, which are typically air guns, are suspended at some preselected depth beneath a float. The float is towed by an exploration vessel and there may be a plurality of such floats towed behind the exploration vessel. The exploration vessel may also tow a streamer cable to detect energy propagating upwardly from subsurface strata lying beneath the body of water in which the vessel operates.

The exploration vessel may determine its location in the body of water through the use of conventional navigation systems. Such systems determine the vessel's location but do not determine the location of any float(s), having impulsive sources attached thereto, that may be towed at varying positions and distances by the vessel. Early attempts to locate floats with respect to the vessel by employing the radar of the vessel and mounting radar reflectors on the float have not proven to be sufficiently accurate nor reliable. Similarly, attempts to use acoustic location devices have had the same or similar shortcomings.

These and other limitations and disadvantages are overcome by the present invention, however, and improved methods and apparatus are provided for locating towed floats relative to the towing vessel.

SUMMARY OF THE INVENTION

In a preferred embodiment of the present invention, apparatus and method are provided for locating a towed float relative to the towing vessel. The method of the present invention determines the range from at least two spaced apart microwave antennas on the vessel to a microwave transponder on the float to thereby determine the position of the float relative to the vessel from the intersection of the at least two ranges. The apparatus of the present invention is a master transceiver selectively interconnectable to a plurality of spaced apart microwave antennas of known location on the vessel and microwave transponders located on the floats at known locations.

It is an object of the present invention to accurately measure the position of one or more towed floats relative to the towing vessel.

These and other objects and advantages of the present invention will become apparent from the following detailed description, wherein reference is made to the Figures in the accompanying drawings.

BRIEF DESCRIPTION OF THE DRAWINGS

FIG. 3 is a block diagram of the apparatus of the present invention.

DETAILED DESCRIPTION OF PREFERRED EMBODIMENTS

Figure 1:
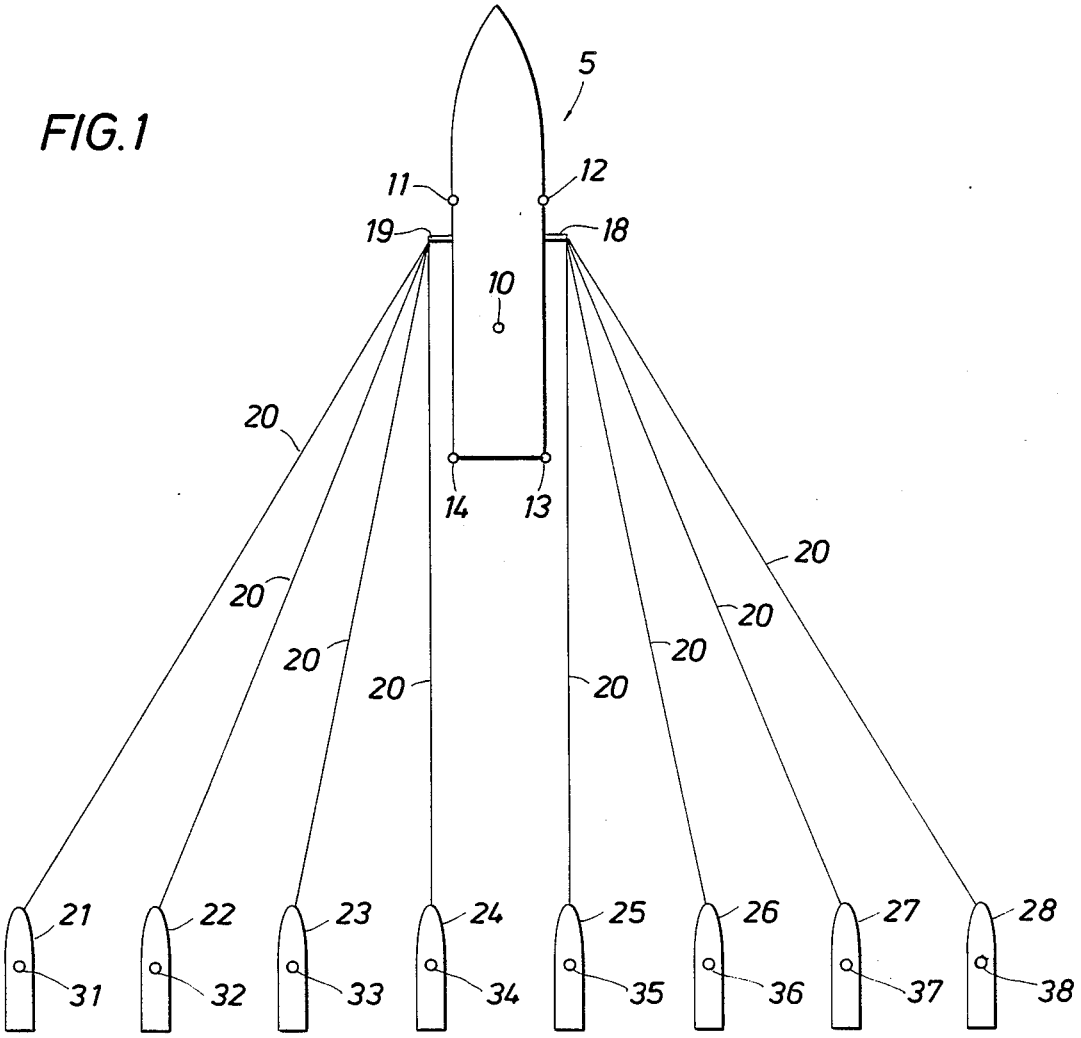
FIG. 1 is a plan view of a vessel towing several floats.

Referring now to FIG. 1, there may be seen a simplified plan view of a vessel 5 towing a plurality of floats 21–28. More particularly, the exploration vessel 5 has mounted thereon a master microwave transceiver 10 which may be selectively interconnected with microwave antennas 11, 12, 13 or 14. These microwave antennas 11-14 are located at spaced apart and known locations relative to the center of the vessel 5. Although four antennas are shown in FIG. 1 (and FIG. 3), this number of antennas is by way of illustration only and is not intended as any limitation on the scope of the present invention.

Vessel 5 also has appropriate towing gear 18 and 19 for towing floats 21–28 with cables 20. Each of the floats 21–28 have a microwave transponder 31–38, respectively, suitably located on the float, also at a known position of the float. Although eight floats are depicted in FIG. 1, this number of floats is for illustration only and is not intended as any limitation on the scope of the present invention.

Referring now to FIG. 3, there may be seen a block diagram of the apparatus of the present invention. More specifically, the master transceiver 10 is shown connected to an antenna switch 15 for interconnecting the transceiver 10 with either antenna 11, antenna 12, antenna 13, or antenna 14. The presently preferred embodiments of the present invention employ four such antennas. However, more than four and fewer than four antennas are considered within the scope of the present invention.

Continuing to refer to FIG. 3, there are also depicted in shadow or outline form the illustrative number of eight floats 21–28, as depicted in FIG. 1. Again, the number of eight floats is by way of illustration and not by way of limitation. Each float 21–28 has a microwave transponder 31–38 located thereon at a known location of the float, as described hereinbefore.

Also depicted in FIG. 3 is the controller 16 that interfaces the transceiver and antenna system with a local computer 17. Local computer 17 has a keyboard 18 for inputting into the computer 17 the desired frequency for determining the location of a float and for what floats and in what sequence, if any. The computer 17 may also have associated therewith a local display **19*a* and a remote display 19*b*; there may be more than one of the local and/or remote displays. The computer 17 also receives data on the course, speed, pitch, roll, etc. of the vessel through an external vessel status interface 40**.

Local computer 17 also provides the float location, vessel heading and time to a host computer 50 in the appropriate format for use by the host computer 50. The host computer 50 may store this information or use it for on-vessel processing or preprocessing of seismic data, as is known in the art.

Figure 2:
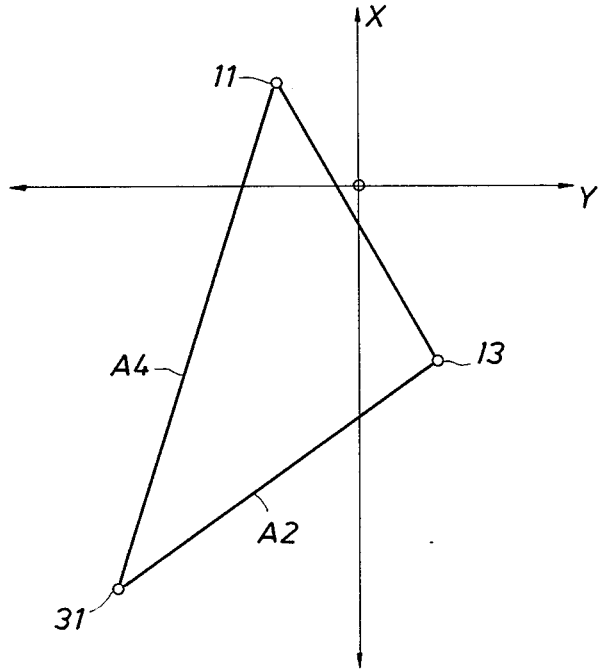
FIG. 2 is a plan view of a portion of the apparatus of the present invention.

Referring now to FIG. 2, there may be seen a simplified plan view of a portion of the apparatus of the present invention, which may be employed to describe the operation of the present invention. This description is offered by way of illustration only and not by way of any limitation on the scope of the present invention. More particularly, antennas 11 and 13 may be seen as well as transponder 31, which is associated with float 21 (not shown). Also depicted is an x-y coordinate system centered at the center of vessel 5, and distances A4 and A2 from antennas 11 and 13 to transponder 31, respectively; the x axis represents the longitudinal (fore and aft) axis of vessel 5.

Continuing to refer to FIG. 2, the x and y coordinates of the antennas 11 and 13 are known because of their fixed and known location on vessel 5. What is sought is the x and y coordinates of transponder 31, or equivalently the position of float 21 (or any other preselected float) relative to vessel 5. This is accomplished as described hereinbelow.

Referring now to FIGS. 2 and 3, master transceiver 10 is connected by antenna switch 15 to antenna 11, in response to directions from controller 16. Controller 16 also directs master transceiver 10 to locate float 21. For the presently preferred embodiments of the present invention, master transceiver 10 broadcasts a coded pulse sequence that selects only float transponder 31 as the responder over antenna 11. All the float transponders 31–38 will receive the broadcast, but all will disregard the broadcast except for transponder 31. Each float transponder may have its own unique coded pulse train to which it automatically responds.

Transponder 31 will recognize its coded pulse sequence and as quickly as possible transmit a response. Alternatively, each float transponder may have a different transmission frequency band although this is not necessary for the present invention when each transponder has its own unique pulse sequence. For embodiments of the present invention which employ transponders having different transmission frequencies, it is possible to detect the location of all the floats substantially simultaneously by employing a plurality of receiver channels tuned to these separate frequencies in the master transceiver 10. Controller 16 measures the time from transmission until it first detects a transmission back from float transponder 31. This length of time includes the time of transmission over and back, or twice the distance A4, as well as fixed equipment times, such as the reception-to-transmission turnaround time for transponder 31. These fixed equipment delays are subtracted out to find the "flight time" and thereby distance A4, as is described hereinbelow. A4 is also corrected for any roll and pitch of vessel 5 during this flight time.

In a similar manner, distance A2 is determined when master transceiver 10 is connected to antenna 13. The intersection of A2 and A4 determine the position of transponder 31, as determined by controller 16.

The fixed equipment delays may be different for each float transponder and should accordingly be determined for each transponder. Controller 16 will contain these delays for each transponder, once determined. These delays may be determined by spacing the transponder a known calibrated distance from one or more antenna, or alternatively by using delay lines having known delays to compare against a transponder signal receipt.

Thus, the method of the present invention determines a plurality of ranges to a preselected location on a towed float from a plurality of spaced apart antennas having known locations on a vessel, and determines the float's location from the intersection of these ranges from the known locations on the vessel. This method requires a minimum of two such ranges, but may employ any number than two. If more than two ranges are employed, each pair of ranges will determine a float position; these float positions may then be averaged or otherwise manipulated mathematically to arrive at one position to be employed as the location of the float. Two antennas are used in the presently preferred embodiment to determine the location of each float. Further, as depicted in FIG. 1, antennas 11 and 13 would be preferably employed to measure floats on the port side of vessel 5 (i.e. floats 21–24), and antennas 12 and 14 to measure floats on the starboard side of vessel 5 (i.e. floats 25–28).

As depicted in FIG. 2, the position of each float is determined relative to an x-y coordinate system aligned along the longitudinal axis of the vessel and centered at the center of the vessel. Alternatively, other coordinate systems may be used and they may have their origins at locations other than the center of the vessel.

Many other variations and modifications may be made in the apparatus and techniques hereinbefore described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. A method of locating a towed object relative to a towing vessel, comprising:

independently determining a plurality of individual ranges from corresponding known preselected locations on said vessel to said towed object; and determining the point of intersection of said plurality of ranges.

2. A method as described in claim 1, wherein said determination of ranges employs microwave energy.

3. A method of locating a towed object relative to a towing vessel, comprising:

determining a first range to said towed object from a first preselected location on said vessel;

independently of said first location, determining a second range to said towed objected from a second preselected location on said vessel; and determining the point of intersection of said first and second ranges.

4. Apparatus for locating a towed object relative to a towing vessel, comprising:

means for determining a first range to said towed object from a first preselected location on said vessel, means for determining a second range to said towed object from a second preselected location on said vessel independently of said first location, and means for determining the point of intersection of said first and second ranges.

5. Apparatus for locating a towed float relative to a towing vessel, comprising:

microwave transponder means disposed on said float responsive to a preselected coded signal;

master microwave transceiver means disposed on said vessel for transmitting preselected coded signals functionally related to a preselected set of first commands;

a plurality of spaced-apart microwave antennas disposed at known locations on said vessel;

antenna switching means for operatively interconnecting said master microwave transceiver with one of said plurality of antennas in functional response to a second set of preselected commands; and controller means for generating said first and second sets of preselected commands to said master transceiver and said antenna switching means, respectively.

* * * * *